United States Patent [19]

Coates

[11] 4,208,397
[45] Jun. 17, 1980

[54] SEMI-REGENERATIVE REFORMING PROCESS PROVIDING CONTINUOUS HYDROGEN PRODUCTION

[75] Inventor: Ronald Coates, Naperville, Ill.

[73] Assignee: Standard Oil Company (Indiana), Chicago, Ill.

[21] Appl. No.: 914,974

[22] Filed: Jun. 12, 1978

Related U.S. Application Data

[63] Continuation-in-part of Ser. No. 752,515, Dec. 20, 1976, abandoned.

[51] Int. Cl.² ............................ C01B 1/16; B01J 23/90
[52] U.S. Cl. ....................................... 423/651; 208/65; 208/140
[58] Field of Search .................. 423/651; 208/140, 65, 208/64; 252/416

[56] References Cited

U.S. PATENT DOCUMENTS 3,198,728  8/1965  Evans ...................................... 208/65
3,375,190  3/1968  McHenry, Jr. et al. ............. 208/140

FOREIGN PATENT DOCUMENTS 848413  8/1970  Canada ...................................... 208/64

Primary Examiner—Delbert E. Gantz
Assistant Examiner—Thomas W. Roy
Attorney, Agent, or Firm—James L. Wilson; William T. McClain; William H. Magidson

[57] ABSTRACT

The process comprises passing a hydrocarbon stream under reforming conditions through each of the reactors of the unit; when the catalyst in all of the reactors in the unit except the lead reactor has become deactivated to such an extent that the catalyst in all of the reactors other than the lead reactor must be regenerated, discontinuing the flow of the hydrocarbon stream through all of the reactors in said unit other than the lead reactor while continuing to pass the hydrocarbon stream through the lead reactor; regenerating the beds of catalyst in each of the reactors of said unit other than the lead reactor to remove the carbonaceous deposits from the catalyst in such beds and to restore at least partially the activity of the catalyst while continuing to pass the hydrocarbon stream through the lead reactor under reforming conditions; resuming the flow of the hydrocarbon stream through all of the reactors in the unit; and repeating all of the aforesaid steps until the catalyst in the lead reactor has become deactivated to such an extent that it must be regenerated. Hydrogen-containing gas need not be recycled to the lead reactor during the regeneration of the catalyst in the other reactors.

The reforming conditions that are employed in the lead reactor of the unit are relatively mild reforming conditions in order to provide an extended period of time of at least 18 months to 3 years for using the catalyst in the lead reactor prior to its becoming deactivated to such an extent that it must be regenerated.

Preferably, the catalyst comprises a Group VIII noble metal.

6 Claims, 1 Drawing Figure

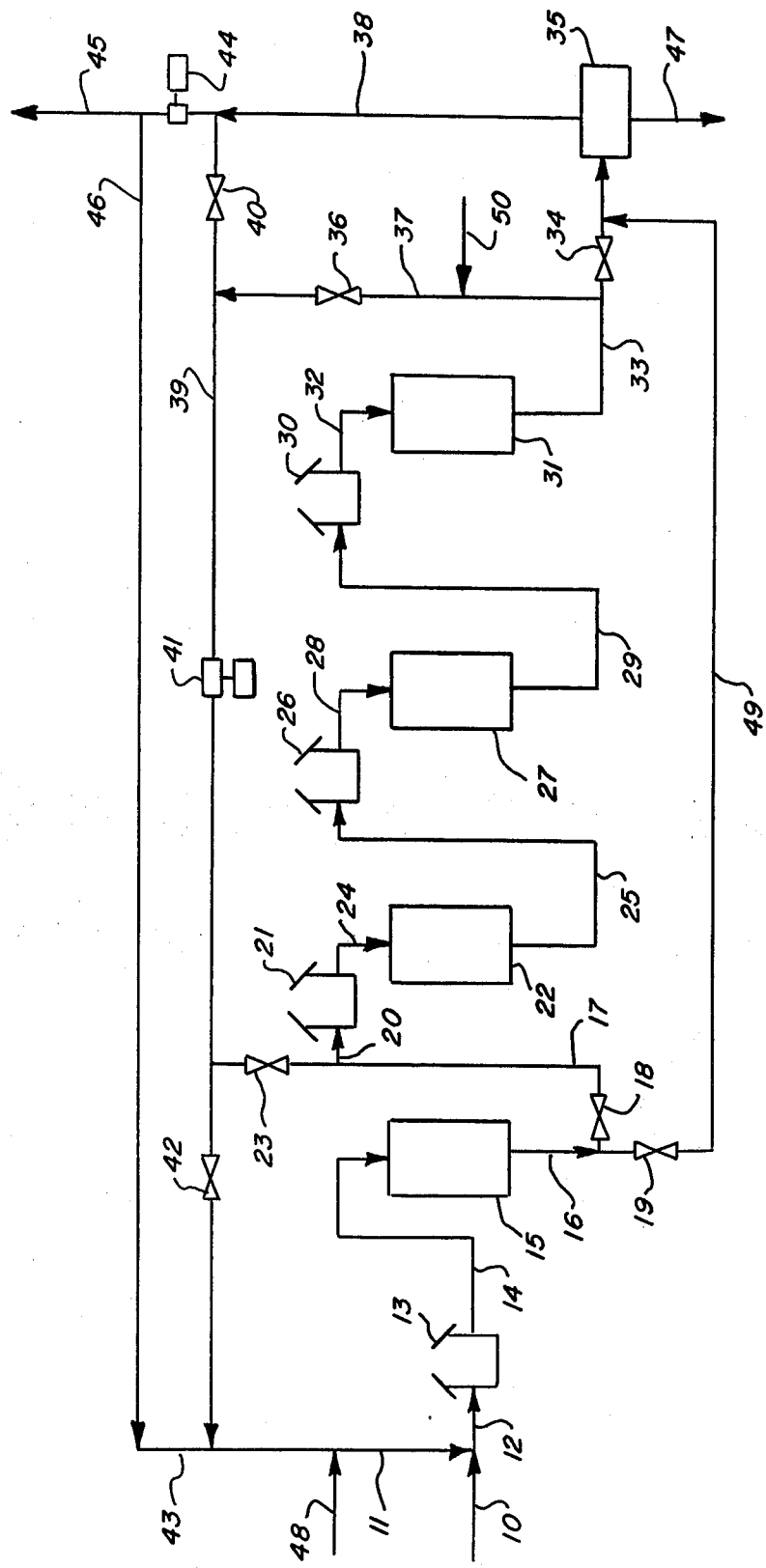

SEMI-REGENERATIVE REFORMING PROCESS PROVIDING CONTINUOUS HYDROGEN PRODUCTION

CROSS-REFERENCE TO RELATED APPLICATION

This is a continuation-in-part application of co-pending Application Ser. No. 752,515, filed in the United States Patent and Trademark Office on Dec. 20, 1976, now abandoned.

BACKGROUND OF THE INVENTION

Among the important petroleum refining processes that are employed in todaay's petroleum refinery are the processes for reforming a petroleum hydrocarbon stream. Such reforming processes not only produce high-octane-number hydrocarbon blending components for gasoline, but also provide a source for relatively pure hydrogen.

There are various types of reforming processes that may be employed. These include non-regenerative processes, semi-regenerative processes, cyclic or regenerative processes, and processes using a moving-bed technique. The cyclic or regenerative processes and the processes employing moving beds furnish continuous production of hydrogen and reformate. On the other hand, semi-regenerative operation requires that the production of hydrogen and reformate be stopped while the catalyst is being regenerated. While the cyclic or regenerative process and the process that employs a moving catalyst bed require expensive regeneration, piping, and valving systems, the semi-regenerative processes eliminate the investment cost for such separate regeneration, piping, and valving systems.

Heard, in U.S. Pat. No. 2,369,734, and Haensel, in U.S. Pat. No. 2,479,110 and U.S. Pat. No. 2,641,582, indicate that the catalyst employed in reforming must be regenerated after periods of service. They do not consider cyclic or regenerative processes. Hence, semi-regenerative techniques are implied, i.e., the entire amount of catalyst is taken off stream and regenerated. They do not consider a process providing continuous hydrogen production. Kluksdahl, in U.S. Pat. No. 3,537,980, also considers semi-regenerative reforming, but does not suggest a process furnishing continuous hydrogen production.

Wolf, et al., in U.S. Pat. No. 2,773,013; Snuggs, et al., in U.S. Pat. No. 2,773,014; and McHenry, et al., in U.S. Pat. No. 3,375,190 present cyclic or regenerative reforming processes.

There has now been developed a semi-regenerative process that is a compromise between the conventional cyclic or regenerative processes and the conventional semi-regenerative processes. This new improved process uses the low-investment semi-regenerative operation, but employs a limited valving and piping system which enables the lead reactor in the system to be isolated from the remainder of the reactor system. This type of operation enables the catalyst in those reactors other than the lead reactor, i.e., the catalyst in the intermediate and the tail reactors, to be regenerated while hydrogen-containing gas and low-octane-number reformate are being produced in the lead reactor.

SUMMARY OF THE INVENTION

Broadly, according to the process of the present invention, there is provided a process for producing a hydrogen-containing gas continuously during the operation of a semi-regenerative unit for the reforming of a petroleum hydrocarbon stream. The process comprises: (1) passing said stream under reforming conditions through each of the reactors of said unit; (2) when the catalyst in all of the reactors in said unit except the lead reactor has become deactivated to such an extent that a major portion of said catalyst in all of the reactors other than the lead reactor must be regenerated, discontinuing the flow of said stream through all of the reactors in said unit other than the lead reactor while continuing to pass said stream through said lead reactor; (3) regenerating the catalyst in each of the reactors of said unit other than said lead reactor to remove the carbonaceous deposits from said catalyst and to restore at least partially the activity of said catalyst while continuing to pass said stream through said lead reactor under reforming conditions; (4) discontinuing the regeneration of the catalyst in each of the reactors of said unit other than the lead reactor and resuming the flow of said stream through all of the reactors in said unit; and (5) repeating all of the above steps until the catalyst in said lead reactor has become deactivated to such an extent that it must be regenerated in order to provide some conversion of said stream to useful products.

The loading of the catalyst in the lead reactor will be between 1 and 4 times the amount of catalyst loaded in each of the other reactors in the system.

The inlet temperature to the lead reactor will be between 25° F. and 150° F. lower than the inlet temperatures of the other reactors in the unit. The inlet temperature to the lead reactor will increase during the cycle at a rate that is about 10 percent to about 100 per cent of the rate that the inlet temperatures to the other reactors are increasing.

Moreover, the lead reactor can be operated without recycle hydrogen while the catalyst in the other reactors is being regenerated.

BRIEF DESCRIPTION OF THE DRAWING

The accompanying FIGURE presents a simplified schematic flow diagram of a preferred embodiment of the process of the present invention, wherein a naphtha is being reformed in a semi-regenerative reforming system comprising four reactors.

DESCRIPTION AND PREFERRED EMBODIMENT

The highly mechanized society of today requires an increasing demand for very-high-octane-number motor fuels. The process of this invention is an improved semi-regenerative reforming process which is advantageous, since it provides for the continuous production of hydrogen and reformate while a major portion of the catalyst in the reforming system is being regenerated. It is used to produce high-octane-number blending components for motor fuels by means of the reforming of petroleum naphthas and petroleum hydrocarbon streams boiling in the gasoline boiling range. It may be employed suitably to produce high-octane-number blending components for unleaded and/or low-lead motor fuels.

Processes for the reforming of a petroleum hydrocarbon stream provide high-octane-number hydrocarbon blending components for gasoline. In the typical reforming process, various reactions take place. These reactions include dehydrogenation reactions, isomerization reactions, and hydrocracking reactions. Examples of the dehydrogenation reactions are the dehydrogenation of cyclohexanes to aromatics, the dehydroisomerization of alkylcyclopentanes to aromatics, the dehydrogenation of paraffins to olefins, and the dehydrocyclization of paraffins and olefins to aromatics. Examples of the isomerization reactions are the isomerization of normal paraffins to isoparaffins, the hydroisomerization of olefins to isoparaffins, the isomerization of alkylcyclopentanes to cyclohexanes, and the isomerization of substituted aromatics. Examples of hydrocracking reactions are hydrodesulfurization and the hydrocracking of paraffins. Adequate discussions of the reactions that occur in a reforming reaction zone are presented in PETROLEUM PROCESSING, R. J. Hengstebeck, McGraw-Hill Book Company, Inc., 1959, pp. 179–184, and in CATALYSIS, Vol. VI, P. H. Emmett, Editor, Reinhold Publishing Corporation, 1958, pp. 497–498.

As pointed out hereinabove, a semi-regenerative reforming process is one of several that may be employed in today's petroleum refinery. In a semi-regenerative reforming process, the catalyst is employed for reforming over an extended period of time. When the catalyst has become deactivated, the reforming operation is stopped and the total amount of catalyst in the reforming unit is regenerated in situ. During the regeneration, no hydrogen-containing gas is being produced. Therefore, this shut-down of the reforming unit for regeneration of the catalyst employed therein is a critical and significant operation in a refinery in which the reformer serves as a source of hydrogen.

While the process of the present invention is a semi-regenerative-type reforming process, it does permit the production continuously of hydrogen-containing gas. This type of process would be very important for those particular refineries which employ semi-regenerative reforming processes and such processes provide hydrogen for use in other units of the refinery. This type of process will become more important as the use of hydrogen increases, particularly where the refinery has only one reformer.

The process of the present invention may be used to reform a feedstock which is a member selected from the group consisting of a virgin naphtha, a cracked naphtha, a hydrocarbon fraction boiling in the gasoline boiling range, and mixtures thereof. It may be used also to reform partially-reformed naphthas and other hydrocarbon streams. A naphtha will exhibit a boiling range of about 70° F. to about 500° F., preferably, about 180° F. to about 400° F. The gasoline boiling range comprises temperatures of about 120° F. to about 420° F., preferably, about 140° F. to about 380° F. The partially-reformed hydrocarbon streams will exhibit an unleaded research octane number within the range of about 60 to about 95. As used herein, the terms "mildly-reformed" and "partially-reformed" refer to such streams as have been reformed to an unleaded research octane number of about 60 to about 95.

Since many of the above feedstocks may contain appreciable amounts of nitrogen and sulfur compounds, which are deleterious to the catalysts of the reforming process of the present invention, it is preferred that the feedstock containing appreciable amounts of such deleterious materials be subjected to a suitable hydrodesulfurization and/or hydrodenitrogenation treatment, such as hydrofining, prior to use in the process of the present invention, in order to reduce both the nitrogen level and the sulfur level to tolerable limits. While the catalyst of the process of the present invention will be poisoned by nitrogen and sulfur, it can be reactivated by regeneration.

Under normal circumstances, the feedstock should be hydrofined prior to being used in the process of the present invention. The level to which the sulfur contents of the feed should be reduced will depend upon the type of reforming catalyst that is employed. If the catalyst is one that contains rhenium, the feedstock should have a sulfur content that is less than 1 ppm sulfur.

Any suitable hydrodesulfurization catalyst may be employed in the hydrodesulfurization pretreatment of the feedstock for the process of the present invention. Such hydrodesulfurization catalyst comprises a hydrogenation component on a refractory inorganic oxide that is non-acidic or only weakly acidic. Typical examples of such catalysts are those comprising one or more members selected from the group consisting of the Group VIB metals and Group VIII metals of the Periodic Table of Elements as set forth in WEBSTER'S SEVENTH NEW COLLEGIATE DICTIONARY, G. & C. MERRIAM COMPANY, Springfield, Mass., U.S.A., 1963, page 628. Typical hydrogenation components are cobalt and molybdenum, nickel and molybdenum, their oxides, and their sulfides. A suitable refractory inorganic oxide is a catalytically active alumina which is described hereinbelow.

Suitable hydrodesulfurization conditions comprise a pressure of about 200 psig to about 1,000 psig, an average catalyst temperature of about 500° F. to about 720° F., a liquid hourly space velocity (LHSV) of about 1 to about 15 volumes of hydrocarbon per hour per volume of catalyst, a hydrogen partial pressure of about 70 psia to about 450 psia, and a hydrogen circulation rate of about 250 to about 1,100 standard cubic feet of hydrogen per barrel of hydrocarbon (SCFB). Preferred hydrodesulfurization conditions comprise a pressure of about 250 psig to about 700 psig, an average catalyst temperature of about 500° F. to about 700° F., a LHSV of about 2 to about 10, a hydrogen partial pressure of about 75 psia to about 450 psia, and a hydrogen circulation rate of about 300 SCFB to about 1,000 SCFB.

The catalyst employed in the process of the present invention comprises a Group VIII noble metal on a catalytically active alumina. Preferably, the catalyst comprises a Group VIII noble metal, a small amount of a metal promoter or promoters, and a halogen on a catalytically active alumina. Platinum, palladium, and iridium are suitable Group VIII noble metals. A typical metal promoter is rhenium. The Group VIII noble metal is preferably platinum and the halogen, which may be either chlorine or fluorine, is preferably chlorine. The Group VIII noble metal is present in an amount of about 0.01 weight percent to about 2.0 weight percent, preferably, from about 0.1 weight percent to about 1.2 weight percent; and the halogen is present in an amount of about 0.01 weight percent to about 2.0 weight percent, preferably from about 0.1 weight percent to about 1.2 weight percent. The amounts are based upon the total catalyst weight.

While a metal promoter, such as rhenium, may be employed in the catalyst of the reforming process of the present invention, it need not be a component of the catalyst. However, since the metal promoter promotes longer catalyst life and hence more time between regenerations, a catalyst containing such metal promoter is preferred. Such metal promoter may be rhenium, iridium, tungsten, or gallium. Preferably, the metal promoter is rhenium, which is present in an amount of about 0.05 weight percent to about 2.5 weight percent, preferably from about 0.1 weight percent to about 1.2 weight percent. These amounts are based upon the total weight of the catalytic composition.

Catalytically active alumina may be obtained commercially. Typical aluminas that may be employed suitably in the catalyst of the process of the present invention are gamma-alumina, eta-alumina, and mixtures thereof. Such an alumina should have an average pore diamter of at least 45 Angstrom units (Å) and a surface area within the range of about 100 square meters per gram to about 800 square meters per gram.

The catalyst may be prepared by impregnating the support material with a solution containing a soluble compound of the Group VIII noble metal and a soluble compound of the metal promoter. The halogen may be introduced by a subsequent solution of an acid halide or a metal halide. In an alternate method of preparation, either 2 or 3 of the above components can be impregnated onto the catalytically active alumina by means of one impregnating solution. Such preparation techniques are well known to those skilled in the art and require no further discussion here.

It is contemplated that the catalyst employed in the process of the present invention, or perhaps a portion of the catalyst employed in the process of the present invention, may contain a small amount of a large-pore crystalline aluminosilicate material. Such large-pore crystalline aluminosilicate material may be present in an amount of about 0.1 weight percent to about 25 weight percent, based upon the weight of the catalytic composition. The term "large-pore" may be defined as being characterized by an average pore size varying from about 6 Å to about 15 Å. Such large-pore crystalline aluminosilicates permit the reactants to pass into and through the pores and the products formed to pass through and out of the pores of the aluminosilicate materials. Typical examples of suitable crystalline aluminosilicate materials are the natural and synthetic faujasites and mordenite. Mordenite is the preferred large-pore crystalline aluminosilicate material.

The following operating conditions are employed in the reforming reaction zones of the process of the present invention; the inlet temperature to the lead reactor will be between 25° F. and 150° F. lower than the inlet temperatures to the other reactors in the reforming system. Therefore, the inlet temperature to the lead reactor may vary from about 845° F. to about 975° F., while the inlet temperatures to the other reactors in the system will vary from about 920° F. to about 1,000° F. The rate of increase of the inlet temperature to the lead reactor during the processing cycle is about 10 percent to about 100 percent of the rate of increase of the inlet temperatures to the other reactors in the unit. The total pressure of the reforming system will vary from about 150 psig to about 450 psig and the rate of hydrogen-containing recycle gas will vary from about 1,000 SCFB to about 5,000 SCFB. The weight hourly space velocity (WHSV) in the system will range from about 2 to about 10 weight units of hydrocarbon per hour per weight unit of catalyst. While the pressure is normally maintained in the range of about 150 psig to about 450 psig, it is to be understood that a lower pressure, for example, 50 psig to about 250 psig may be employed, particularly when the catalyst contains a promoter, such as rhenium. However, the use of such low pressures will require more frequent regenerations of the catalyst in the system. Consequently, it is believed that the process of the present invention should not be used for any long period of time at the very low pressures. In view of the above, a suitable range of pressures is about 50 psig to about 450 psig. The preferred operating conditions of the process of the present invention include an inlet temperature for the lead reactor of about 845° F. to about 925° F. and inlet temperatures for the other reactors in the system of about 900° F. to about 980° F., a pressure of about 175 psig to about 315 psig, a hydrogen-containing recycle gas rate of about 1,500 SCFB to about 3,000 SCFB; and a WHSV of about 3 to about 5 weight units of hydrocarbon per hour per weight unit of catalyst.

The reactor system for the process of the present invention may contain from 3 to 5 reactors, ordinarily. The lead reactor is the name specified for the first reactor in the system. It is to be understood that in some cases the first two reactors may be considered as lead reactors. This will depend upon the amount of catalyst being employed in the system and to the proportionate amount of catalyst in the lead reactor as compared to the other reactors in the system. Although the term "lead reactor" is written herein, it is to be understood that it would comprise any other subsequent reactor which would be used as a lead reactor in the system; hence, the term "lead reactor" could designate two reactors in a five reactor system, if the first two were to be used as the lead reactor.

As reforming occurs in the process of the present invention, carbonaceous deposits or coke deposits accumulate on the surface of the catalyst in the various reactors. The build-up of such carbonaceous deposits deleteriously affects the activity of the catalyst, so that after a period of time the catalyst has become deactivated. Then the catalyst must be regenerated and/or reactivated, when appreciable deactivation has occurred. The semi-regenerative process of the present invention is designed so that the catalyst in all of the reactors other than the lead reactor may be regenerated while the lead reactor is being employed to produce low-octane reformate and hydrogen-containing gas. The system has a limited valving and piping system which enables the lead reactor to be isolated from the remaining reactors in the system. In this way, the catalysts in the other reactors of the system can be regenerated while the lead reactor is being employed to provide the hydrogen-containing gas and the low-octane reformate.

It is to be understood that, when the lead reactor is being employed to provide the hydrogen-containing gas and the low-octane reformate while the catalyst in the other reactors is being regenerated, the lead reactor can be operated without hydrogen-containing recycle gas. In such instance, the compressor in the system can be used to handle regeneration gases. On the other hand, if for some reason hydrogen-containing recycle gas is desired to be introduced into the lead reactor during the regeneration of the catalyst in the remaining reactors, an auxiliary compressor would be needed. This is discussed further in the example which follows.

The hydrogen-containing gas produced during the regeneration operation can be used as a source of hydrogen for other units in the refinery. The low-octane reformate, i.e., the partially-reformed material, can be reprocessed or used as blending stock where the refinery has only one reformer.

When the lead reactor has been isolated from the other reactors in the system, the catalyst in the other reactors is regenerated by passing an oxygen-containing gas through the catalyst beds to provide a controlled burning of the carbonaceous deposits thereon, so as to remove the carbonaceous deposits from the surface of the catalyst. The burning may be controlled by varying the amount of oxygen that is introduced into the reaction zone. If desired, the halogen content of the catalyst can be increased during such regeneration sequence by the addition of a compound containing the required halogen. Such techniques are well known to those having ordinary skill in the art and will not be discussed further.

As pointed out hereinabove, the catalytic composition that is employed in the process of the present invention may contain as a component a small amount of a promoter, such as rhenium. Catalysts containing such promoters may provide initially an amount of light hydrocarbon gases that is excessive. This initial high hydrocracking activity of the catalyst may be substantially reduced or eliminated, if the catalyst is pretreated prior to start-up or prior to bringing the catalyst back on stream after a regeneration. An appropriate pretreatment comprises the sulfiding of the catalyst prior to its being used to reform naphtha. A sulfur-containing gas may be passed through the catalyst bed or beds in situ. As an alternate, the catalyst may be presulfided prior to being charged to the various reactors of the reforming process. Of course, when the catalyst is regenerated, it would be presulfided in situ. Hydrogen sulfide is a typical sulfur-containing gas that may be employed. The sulfur-containing component may be introduced in any manner into the reactors containing the catalyst that is being regenerated. When the desired amount of sulfur has been introduced onto the catalyst, the addition of the sulfur should be discontinued. The amount of time that would be necessary to adequately control the initial hydrocracking activity will vary according to the amount of sulfur that has been added or the severity of the operation. While this is only one way of controlling the initial excessive hydrocracking activity, it is to be understood that other suitable techniques known to those in the art may be employed.

Broadly, there is provided a process for producing a hydrogen-containing gas continuously in the operation of a semi-regenerative unit for the reforming of a petroleum hydrocarbon stream, which process comprises: (1) passing said stream under reforming conditions through each of the reactors of said unit, the reforming conditions that are employed in the lead reactor of said unit being relatively mild reforming conditions in order to provide an extended period of time for using the catalyst in said lead reactor prior to its becoming deactivated to such an extent that it must be regenerated, said extended period of time being at least 18 months to 3 years of operation; (2) when the catalyst in all of the reactors in said unit except the lead reactor has become deactivated to such an extent that said catalyst in all of the reactors other than the lead reactor must be regenerated, discontinuing the flow of said stream through all of the reactors in said unit other than the lead reactor while continuing to pass said stream through said lead reactor; (3) regenerating the catalyst in each of the reactors of said unit other than said lead reactor to remove the carbonaceous deposits from said catalyst and to restore at least partially the activity of said catalyst while continuing to pass said stream through said lead reactor under reforming conditions; (4) discontinuing the regeneration of the catalyst in each of the reactors of said unit other than the lead reactor and resuming the flow of said stream through all of the reactors in said unit; and (5) repeating all of the aforesaid steps until the catalyst in said lead reactor has become deactivated to such an extent it must be regenerated in order to provide some conversion of said stream to useful products.

In one embodiment of the process of the present invention there is provided a process for producing a hydrogen-containing gas continuously in the operation of a semi-regenerative unit for the reforming of a petroleum hydrocarbon stream, which process comprises (1) passing said stream under reforming conditions through each of the reactors of said unit, the reforming conditions that are employed in the lead reactor of said unit being relatively mild reforming conditions comprising an inlet temperature of about 845° F. to about 975° F., a pressure of about 50 psig to about 450 psig, a WHSV of about 2 to about 10 weight units of hydrocarbon per hour per weight unit of catalyst, and a rate of hydrogen-containing recycle gas of about 1,000 SCFB to about 5,000 SCFB in order to provide an extended period of time for using the catalyst in said lead reactor prior to its becoming deactivated, said extended period of time being at least 18 months to 3 years of operation; (2) when the catalyst in all of the reactors in said unit except the lead reactor has become deactivated, discontinuing the flow of said stream through all of the reactors in said unit other than the lead reactor while continuing to pass said stream through said lead reactor; (3) regenerating the catalyst in each of the reactors of said unit other than said lead reactor to remove the carbonaceous deposits from said catalyst and to restore at least partially the activity of said catalyst while continuing to pass said stream through said lead reactor under reforming conditions; (4) discontinuing the regeneration of the catalyst in each of the reactors of said unit other than the lead reactor and resuming the flow of said stream through all of the reactors in said unit; and (5) repeating all of the aforesaid steps until the catalyst in said lead reactor has become deactivated and it must be regenerated in order to provide some conversion of said stream to useful products.

In another embodiment of the process of the present invention there is provided a process for producing a hydrogen-containing gas continuously in the operation of a semi-regenerative unit for the reforming of a petroleum hydrocarbon stream, said process employing a catalyst comprising a Group VIII noble metal on a catalytically active alumina, which process comprises: (1) passing said stream under reforming conditions through each of the reactors of said unit, the reforming conditions that are employed in the lead reactor of said unit being relatively mild reforming conditions comprising an inlet temperature of about 845° F. to about 975° F., a pressure of about 50 psig to about 450 psig, a WHSV of about 2 to about 10 weight units of hydrocarbon per hour per weight unit of catalyst, and a rate of hydrogen-containing recycle gas of about 1,000 SCFB to about 5,000 SCFB in order to provide an extended period of time for using the catalyst in said lead reactor prior to its becoming deactivated, said extended period of time being at least 18 months to 3 years of operation; (2) when the catalyst in all of the reactors in said unit except the lead reactor has become deactivated, discontinuing the flow of said stream through all of the reactors in said unit other than the lead reactor while continuing to pass said stream through said lead reactor; (3) regenerating the catalyst in each of the reactors of said unit other than said lead reactor to remove the carbonaceous deposits from said catalyst and to restore at least partially the activity of said catalyst while continuing to pass said stream through said lead reactor under reforming conditions; (4) discontinuing the regeneration of the catalyst in each of the reactors of said unit other than the lead reactor and resuming the flow of said stream through all of the reactors in said unit; and (5) repeating all of the aforesaid steps until the catalyst in said lead reactor has become deactivated and it must be regenerated in order to provide some conversion of said stream to useful products.

In yet another embodiment of the process of the present invention, the catalyst employed therein comprises a Group VIII noble metal, a small amount of a metal promoter or promoters, and a halogen on a catalytically active alumina.

The loading of the catalyst in the various reactors of the system should be made as follows: the amount of catalyst in the lead reactor will be between 1 and 4 times the amount of catalyst in each of the other reactors in the system. Preferably, the amount of catalyst in the lead reactor will be between 1 and 2 times the amount of catalyst in each of the other reactors in the system. Therefore, in a four reactor system, the lead reactor will contain between 25 and about 58 weight percent of the catalyst in the system. Each of the other reactors would contain anywhere from about 14 to about 25 weight percent of the catalyst in the system.

A preferred embodiment of the improved process of the present invention is presented in the following example. This example is presented for the purposes of illustration only and is not intended to limit the scope of the present invention.

EXAMPLE

A simplified flow scheme of a preferred embodiment of the process of the present invention is presented in the accompanying FIGURE. Only those pieces of auxiliary equipment which are required for a full understanding of the process are presented in the FIGURE. Certain pieces of auxiliary equipment, such as pumps, compressors, heat exchangers, and some valves are not shown. The use and location of such pieces of auxiliary equipment are well known to those skilled in the art and, therefore, these certain pieces of auxiliary equipment are not necessary to depict the process.

Referring to the FIGURE, a hydrodesulfurized naphtha, boiling in the range of about 70° F. to about 500° F. and containing less than 1 ppm sulfur, is passed through line 10 to be admixed with recycle gas from line 11 to form a recycle-gas-naphtha stream. The resulting recycle-gas-naphtha stream is passed through line 12 into furnace 13, where it is heated to a temperature that will provide the desired inlet temperature for reactor 15. The heated recycle-gas-naphtha stream is passed through line 14 into the top of reactor 15, which is the lead reactor in the reforming system. Reactor 15 contains 40 percent of the catalyst in the entire reactor system. The inlet temperature for reactor 15 falls within the range of about 845° F. to about 975° F.

The catalyst employed in the system is a catalyst comprising 0.3 weight percent platinum, 0.3 weight percent rhenium, and 0.6 to 0.9 weight percent combined chlorine on a catalytically active alumina.

The effluent from reactor 15 is passed through line 16 and line 17. Valve 18 in line 17 is open while valve 19 in line 16 is closed. The effluent from reactor 15 is then passed through line 20 into furnace 21, where it is heated to a temperature that will provide the desired inlet temperature for reactor 22. Valve 23 in line 17 remains closed. The heated stream from furnace 21 is passed through line 24 into the top of reactor 22. The catalyst in reactor 22 comprises 20 percent of the catalyst employed in the total reactor system. The inlet temperature for reactor 22 is maintained within the range of about 920° F. to about 1,000° F.

The effluent from reactor 22 is passed through line 25 into furnace 26, where it is heated to a temperature that will provide an inlet temperature that is required for reactor 27. The heated stream is passed from furnace 26 through line 28 into the top of reactor 27. The amount of catalyst in reactor 27 constitutes 20 percent of the total catalyst in the system. The inlet temperature for reactor 27 is maintained within the range of about 920° F. to about 1,000° F.

The effluent from reactor 27 is passed through line 29 into furnace 30, where it is heated to a temperature that will provide the desired inlet temperature for reactor 31. The heated material is passed from furnace 30 through line 32 into the top of reactor 31. Reactor 31 contains 20 percent of the catalyst that is employed in the reactor system. The inlet temperature for reactor 31 is maintained within the range of about 920° F. to about 1,000° F.

The effluent from reactor 31 is passed through line 33 and valve 34 into high-pressure separator 35. Valve 34 in line 33 is open while valve 36 in line 37 remains closed. The hydrogen-containing gas is separated from the liquid effluent in separator 35 and is passed as recycle gas through line 38, line 39, and valve 40 to compressor 41. The recycle gas is then passed through line 39 and valve 42 to line 43. Valve 42 in line 39 is open while valve 23 in line 17 remains closed. In addition, any excess recycle gas is passed from high-pressure separator 35 through line 38 and optional booster compressor 44, if in the system, to line 45, where it is removed from the recycle system for use in other refinery units.

The liquid effluent is withdrawn from separator 35 by way of line 47 and is sent to appropriate product recovery equipment.

The recycle gas is passed through line 43 and line 11 to be admixed with the hydrocarbon feedstream in line 10 as discussed hereinabove. If any make-up hydrogen is available and is needed, it may be introduced into the recycle gas system in line 43 via line 48.

The total pressure of the system is maintained between about 175 psig and 350 psig. The hydrogen partial pressure is maintained at about 150 psia to about 300 psia and the hydrogen-containing recycle gas rate falls within the range of about 1,000 SCFB to about 5,000 SCFB. The WHSV is held at about 2 to about 10 weight units per hour per weight unit of catalyst.

About every 6 months, or after a period consistent with economical operation, reactors 22, 27, and 31 should be removed from the reforming process system and the catalyst therein regenerated. For this regeneration technique, the effluent coming from reactor 15 and line 16 is passed through valve 19 and line 49 into line 33. Valve 19 in line 16 is opened and valve 18 in line 17 and valve 34 in line 33 are closed. By this arrangement, the hydrocarbon feedstream continues to flow through reactor 15, the lead reactor, but bypasses reactors 22, 27, and 31 and goes directly to the high-pressure separator 35. Of course, hydrogen-containing gas and low-octane reformate are separated in separator 35.

Some hydrogen-containing gas can be recycled to the lead reactor, reactor 15, by closing valve 40 so that the recycle gas passes through line 38 to optional compressor 44, a booster compressor, and then through lines 46, 43, and 11 to be joined with the feedstock being charged to the system. Compressor 44 is optional, since hydrogen-containing recycle gas need not be recycled to the lead reactor during the regeneration of the catalyst in the other reactors. If, for some reason, recycle gas is desired for the lead reactor during such operation, the booster compressor would be needed.

The catalyst in reactors 22, 27, and 31 is regenerated. Valves 40 and 42 in line 39 are closed, while valve 23 in line 17 is opened. Valve 18 in line 17 and valve 34 in line 33 are closed. Regeneration gases can be introduced into the reactor system by line 50. With valve 36 in line 37 being open, the regeneration gases pass through line 39, compressor 41, line 17, valve 23, and line 20 into furnace 21. The regeneration gases are then passed on through reactors 22, 27, and 31 to line 33. Since valve 34 is closed, the regeneration gases are passed through line 37 to be recirculated through the reactor system.

At this time, compressor 41 is being used to move regeneration gases. Optional compressor 44 is not needed. When all the reactors are on oil, compressor 41 is used to circulate hydrogen-containing recycle gas through the system. Hence, only compressor 41 is required. Typically, the booster compressor 44 is not employed and, therefore, is omitted from the system. Investment costs are reduced.

Of course, when the catalyst in reactors 22, 27, and 31 has been regenerated, the appropriate valving can be operated and these reactors may be returned to the system for processing the hydrocarbon effluent that is withdrawn from reactor 15.

It can be seen easily that the use of the novel valving and piping arrangement in this improved semi-regenerative system provides a continuous stream of hydrogen-containing gas. The reactors in the system other than the lead reactor contain regenerated catalyst and when placed into the processing system will provide high-octane reformate again. Hence, the regeneration of the catalyst in the various reactors excluding the lead reactor can be accomplished without the added expense of a complicated swing-reactor system and a regeneration compressor. The absence of the booster compressor 44 provides an additional cost advantage for this processing scheme.

What is claimed is:

1. A process for producing a hydrogen-containing gas continuously in the operation of a semi-regenerative unit for the reforming of a petroleum hydrocarbon stream in the presence of a reforming catalyst, which process comprises: (1) passing said stream under reforming conditions through each of the reactors of said unit, the reforming conditions that are employed in the lead reactor of said unit being relatively mild reforming conditions comprising an inlet temperature of about 845° F. to about 975° F., a pressure of about 50 psig to about 450 psig, a WHSV of about 2 to about 10 weight units of hydrocarbon per hour per weight unit of catalyst, and a rate of hydrogen-containing recycle gas of about 1,000 SCFB to about 5,000 SCFB in order to provide an extended period of time for using the catalyst in said lead reactor prior to its becoming deactivated, said extended period of time being at least 18 months to 3 years of operation, said inlet temperature to the lead reactor being about 25° F. to about 150° F. below the inlet temperatures to the other reactors in the system at the start of the processing cycle, the rate of increase of the inlet temperature to the lead reactor during the cycle being about 10 percent to about 100 percent of the rate of increase of the inlet temperatures to the other reactors; (2) when the catalyst in all of the reactors in said unit except the lead reactor has become deactivated, discontinuing the flow of said stream through all of the reactors in said unit other than the lead reactor while continuing the pass said stream through said lead reactor; (3) regenerating the catalyst in each of the reactors of said unit other than said lead reactor to remove the carbonaceous deposits from said catalyst and to restore at least partially the activity of said catalyst while continuing to pass said stream through said lead reactor under reforming conditions; (4) discontinuing the regeneration of the catalyst in each of the reactors of said unit other than the lead reactor and resuming the flow of said stream through all of the reactors in said unit; and (5) repeating all of the aforesaid steps until the catalyst in said lead reactor has become deactivated and it must be regenerated in order to provide some conversion of said stream to useful products.

2. The process of claim 1, wherein the amount of catalyst in the lead reactor is equivalent to an amount that is 1 to 4 times the amount of catalyst in each of the remaining reactors in the system.

3. The process of claim 1, wherein said process employs a catalyst comprising a Group VIII noble metal and a catalytically active alumina.

4. The process of claim 3, wherein the amount of catalyst in the lead reactor is equivalent to an amount that is 1 to 4 times the amount of catalyst in each of the remaining reactors in the system.

5. The process of claim 3, wherein said catalyst includes a small amount of a promoter or promoters and a halogen, said small amount of promoter being within the range of about 0.05 weight percent to about 2.5 weight percent, based upon the total weight of the catalyst, and said halogen being present in an amount within the range of about 0.01 weight percent to about 2.0 weight percent, based upon the total weight of catalyst.

6. The process of claim 5, wherein the amount of catalyst in the lead reactor is equivalent to an amount that is 1 to 4 times the amount of catalyst in each of the remaining reactors in the system.

* * * * *